(12) United States Patent
Jaeger

(10) Patent No.: US 8,709,216 B2
(45) Date of Patent: Apr. 29, 2014

(54) FRESH WATER RECOVERY SYSTEM

(76) Inventor: Dwight L. Jaeger, Prescott, AZ (US)

(*) Notice: Subject to any disclaimer, the term of this patent is extended or adjusted under 35 U.S.C. 154(b) by 404 days.

(21) Appl. No.: 13/011,877

(22) Filed: Jan. 22, 2011

(65) Prior Publication Data

US 2012/0186970 A1 Jul. 26, 2012

(51) Int. Cl.
*C02F 1/14* (2006.01)
*B01D 3/02* (2006.01)
*B01D 5/00* (2006.01)

(52) U.S. Cl.
USPC ............ 203/10; 62/238.5; 62/515; 159/47.1; 159/903; 165/163; 165/177; 202/234; 203/100; 203/DIG. 1; 203/DIG. 4

(58) Field of Classification Search
USPC ......... 62/238.5, 515; 165/163, 177; 159/26.1, 159/47.1, 903; 202/234; 203/10, 100, 203/DIG. 1, DIG. 4
See application file for complete search history.

(56) References Cited

U.S. PATENT DOCUMENTS

| | | | | |
|---|---|---|---|---|
| 4,135,985 A * | 1/1979 | La Rocca | | 203/22 |
| 4,235,678 A * | 11/1980 | McKeen | | 203/11 |
| 4,383,891 A | 5/1983 | Clavier | | |
| 4,853,264 A | 8/1989 | Vincent et al. | | |
| 5,316,626 A * | 5/1994 | Guy | | 203/10 |
| 6,623,603 B1 * | 9/2003 | Call et al. | | 202/155 |
| 7,641,772 B2 * | 1/2010 | Zebuhr | | 203/2 |
| 2002/0179425 A1 * | 12/2002 | Dableh | | 203/1 |
| 2008/0041095 A1 * | 2/2008 | Higashiyama | | 62/515 |

* cited by examiner

*Primary Examiner* — Virginia Manoharan
(74) *Attorney, Agent, or Firm* — Paul D. Chancellor; Ocean Law

(57) ABSTRACT

A fresh water recovery system includes a solar heated evaporator and a heat exchanger operating in a waste heat recovery mode for recovering fresh water from a salt water supply.

1 Claim, 7 Drawing Sheets

FIGURE 5

| State Point | Description | State |
|---|---|---|
| 1 | Heat exchanger, salt water side inlet | Relatively cool salt water liquid |
| 2 | Heat exchanger, salt water side outlet | Relatively hot salt water liquid, temperature near evaporator temperature |
| 3 | Contents of hot salt water tank | Relatively hot salt water liquid, temperature near evaporator temperature |
| 4 | Third supply line | Relatively hot salt water liquid, temperature near evaporator temperature |
| 5 | Evaporator liquid contents | Relatively hot salt water liquid at evaporator temperature |
| 6 | Evaporator vapor space | Relatively hot fresh water vapor at evaporator temperature |
| 7 | Heat exchanger, fresh water side inlet | Relatively hot fresh water vapor at evaporator temperature |
| 8 | Heat exchanger, fresh water side outlet | Relatively cool fresh water liquid at or below evaporator temperature |
| 9 | Contents of condensate storage tank | Fresh water liquid |
| 10 | Condensate storage tank outlet | Fresh water liquid |
| 11 | Contents of evaporator after evaporation concentrates salt | Includes concentrated salt solution and/or dry salt |

FRESH WATER RECOVERY SYSTEM

BACKGROUND OF THE INVENTION

1. Field of the Invention

The present invention relates to an apparatus and method for purifying water. In particular, solar heating with process heat recovery provides energy for evaporating salt water.

2. Discussion of the Related Art

Solar energy has long been used to evaporate sea water for the purpose of recovering salt. Large scale salt production facilities typically include salt water evaporation ponds that rely on solar energy to evaporate the liquid, leaving the salt as a solid deposit on the pond containment sidewalls and bottom.

Less well known are large scale evaporative systems whose primary product is fresh water and whose secondary product is salt. As compared to salt recovery systems, fresh water recovery systems require considerably more process equipment, a feature that drives up system capital and operating costs.

Broad adoption of large scale solar powered fresh water recovery systems hinges, among other things, on more economical designs that reliably make fresh water at a cost lower than competing technologies such as ground water recovery.

SUMMARY OF THE INVENTION

A fresh water recovery system includes a solar evaporator and waste heat recovery means. In an embodiment, the fresh water recovery system comprises a heat exchanger having first and second passages for exchanging heat between a salt water stream and a fresh water stream, the heat exchanger salt water passage fluidly coupling a salt water storage tank and a hot salt water storage tank, the heat exchanger fresh water passage fluidly coupling a solar evaporator vent and a clean water storage tank, and the solar evaporator receiving liquid from the hot water storage tank and providing vapor to the heat exchanger.

In some embodiments a divided tube heat exchanger is employed, the heat exchanger having a condensing section and a non-condensing section, a tubular envelope containing the two streams, a septum separating the two streams, and the septum designed to present a greater heat transfer area than available from a planar septum.

And, in some embodiments gravity flow is promoted. Here, the liquid level of the salt water tank is greater than the liquid level of the hot salt water storage tank which is greater than the liquid level of a liquid space of the evaporator.

BRIEF DESCRIPTION OF THE DRAWINGS

The present invention is described with reference to the accompanying figures. These figures, incorporated herein and forming part of the specification, illustrate the invention and, together with the description, further serve to explain its principles enabling a person skilled in the relevant art to make and use the invention.

FIG. 5 is table listing selected state points of the third embodiment of the fresh water recovery system shown in FIG. 4.

DETAILED DESCRIPTION OF THE PREFERRED EMBODIMENTS

The disclosure provided in the following pages describes examples of some embodiments of the invention. The designs, figures, and description are non-limiting examples of embodiments they disclose. For example, other embodiments of the disclosed device and/or method may or may not include the features described herein. Moreover, disclosed advantages and benefits may apply to only certain embodiments of the invention and should not be used to limit the disclosed invention.

Figure 1:
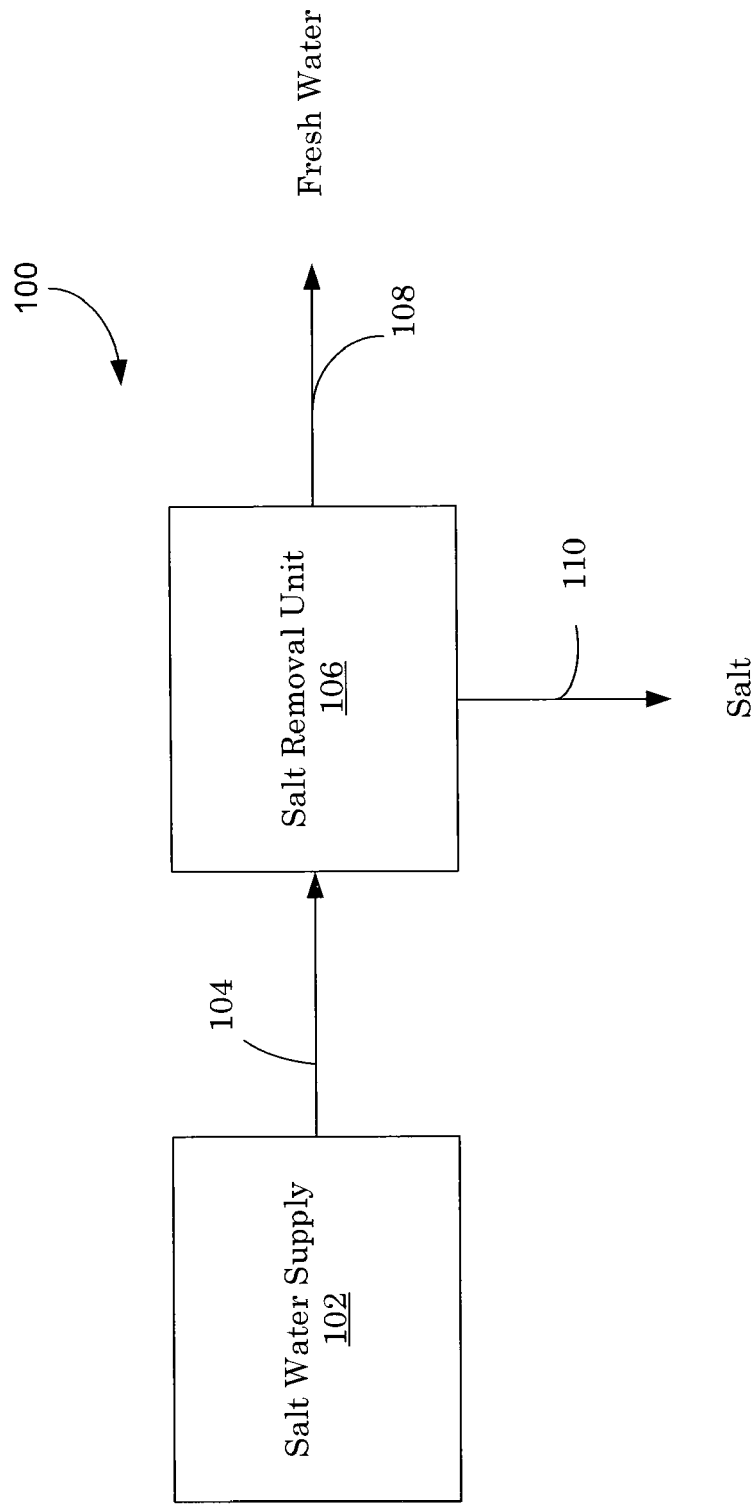
FIG. 1 is a schematic diagram showing a fresh water recovery system in accordance with the present invention.

FIG. 1 shows a fresh water recovery system in accordance with the present invention 100. A salt removal unit 106 receives salt water via a supply line 104 from a salt water supply 102. Processes carried out in the salt removal unit yield fresh water 108 and salt 110 products. In various embodiments, solar energy provides heat for evaporating water.

Figure 2:
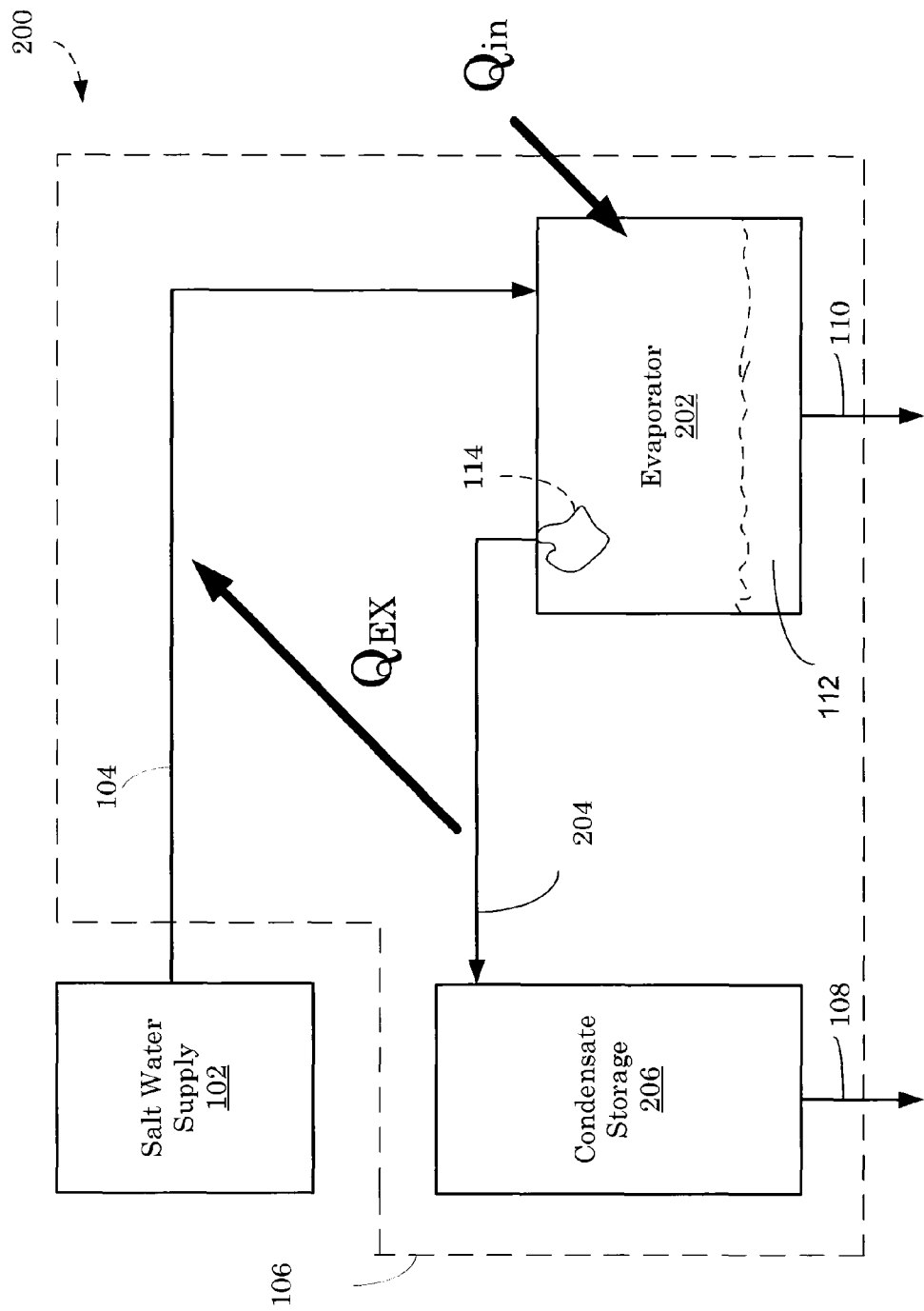
FIG. 2 is a schematic diagram showing a second embodiment of the fresh water recovery system of FIG. 1.

FIG. 2 shows a second embodiment of the fresh water recovery system 200. A salt removal unit 106 receives salt water via a supply line 104 from a salt water supply 102. In the salt removal unit 106, a transfer line 204 fluidly interconnects an evaporator 202 and a condensate storage tank 206.

Figure 3:
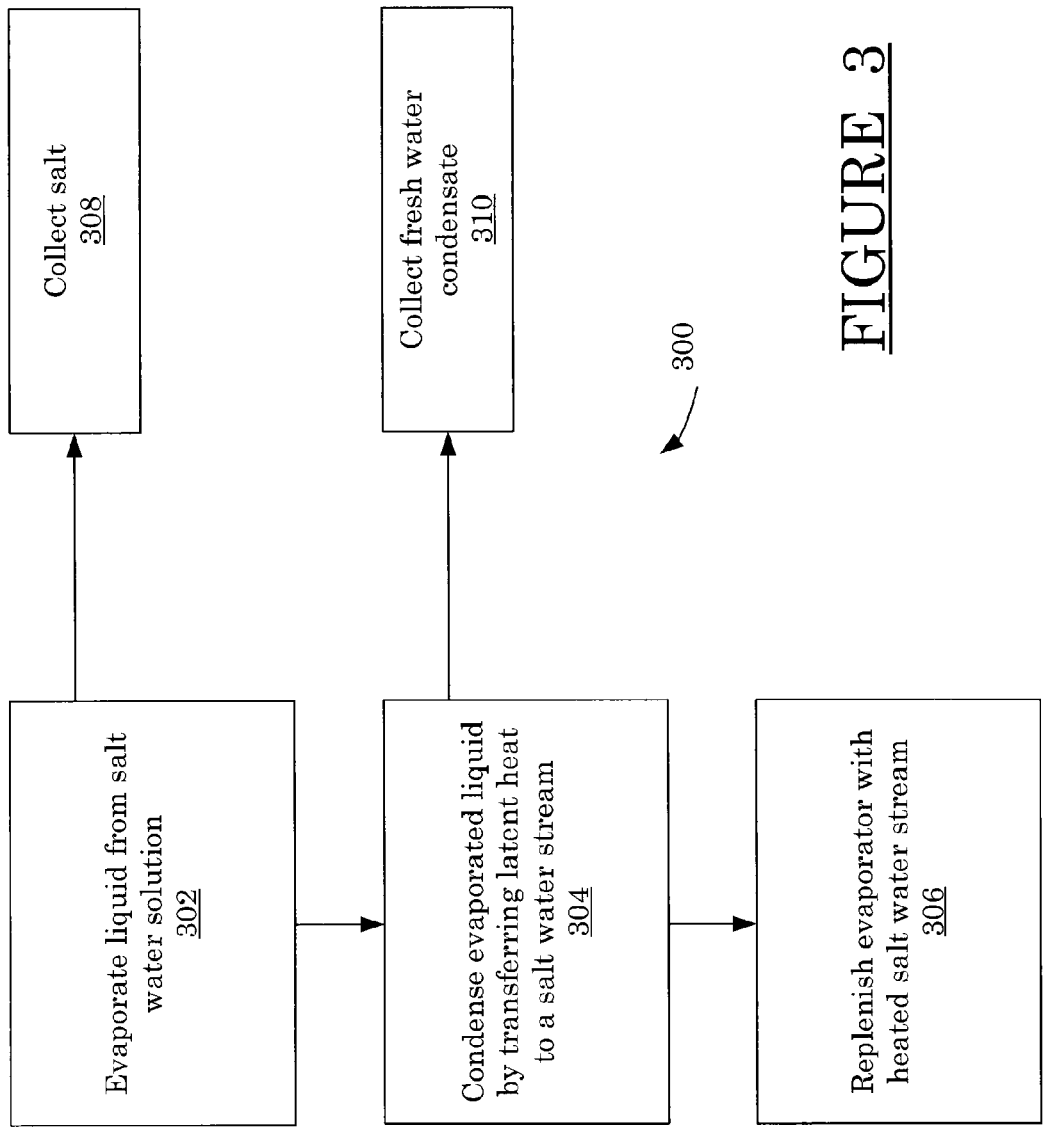
FIG. 3 is a process chart showing selected fresh water recovery process steps implemented in some embodiments of the fresh water recovery system of FIG. 1.

FIG. 3 shows selected fresh water recovery process steps implemented in an embodiment of the fresh water recovery system 300. Liquid is evaporated from a salt water solution 302 and the solution residue, salt or a concentrated salt solution, is collected 308. The evaporated liquid, fresh water, is condensed by transfer of its latent heat to an incoming salt water supply stream 304 and the condensed freshwater is collected 310. Evaporator liquid is replenished by the heated salt water supply stream 306. As required by the arrangement of the system components, one or more pumps and/or gravity may be used to move fluids throughout the system.

In an embodiment, a process similar to that of FIG. 3 is implemented in the fresh water recovery system of FIG. 2. In various embodiments, solar energy supplies heat to the evaporator $Q_{in}$ causing its salt water contents 112 to evaporate. The resulting fresh water vapor 114 leaves the evaporator via the transfer line 204. Heat transfer $Q_{EX}$ from the vapor in the transfer line to the liquid in the supply line 104 causes a) condensation of the fresh water vapor before it enters the condensate storage tank 206 and b) heating of the salt water supply before it enters the evaporator.

As will be understood by persons of ordinary skill in the art, use of $Q_{EX}$ is a form of waste heat recovery that reduces $Q_{in}$ requirements by increasing the temperature of the salt water supplied to the evaporator 104. In some embodiments, $Q_{EX}$ is sufficient to evaporate at least a portion of the salt water supplied to the evaporator. And, in an embodiment, $Q_{in}$ serves to heat the salt water supply to a temperature about equal to its boiling point.

Operation of the evaporator 202 produces fresh water 108 and salt 110. The form of salt production depends on the evaporator equipment and its mode of operation. In various embodiments, one or more of a concentrated salt solution and salt solids deposited on surfaces of the evaporator are produced. Salt may be continuously removed or batch wise removed from the evaporator. For example, evaporators producing dry salt can be operated in a batch wise salt recovery mode where the evaporator is replenished with salt water after the dried salt has been removed.

In an embodiment, an evaporator 202 with suitable fenestration 420 (see FIG. 4) includes a liquid impound or containment 112. Exemplary evaporators include solar heated evaporators and in particular greenhouse evaporators such as those discussed in U.S. Pat. No. 4,383,891 to Clavier in column 1 et seq. Exemplary impounds include earthen containments such as ponds and structural containments such as tanks. Exemplary fenestration includes one or multiple panes of transparent or translucent material for admitting solar energy into the evaporator. In various embodiments, fenestration includes one or more of planar and curved solar passing materials such as those discussed in U.S. Pat. No. 4,853,264 to Vincent et al. in the Background of the Invention and in the Detailed Description of the Invention. The patents cited in this paragraph are, in their entireties and for all purposes, incorporated into the present application.

Figure 4:
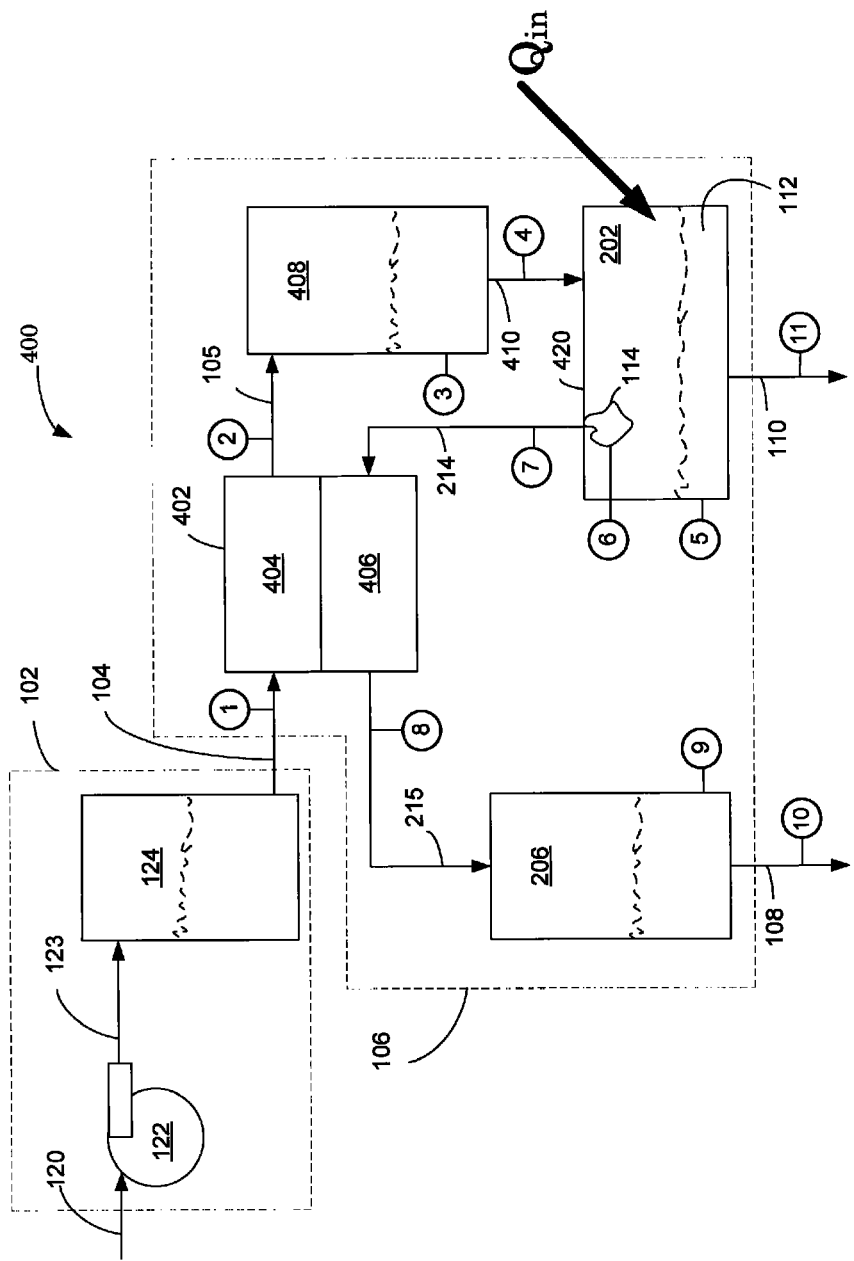
FIG. 4 is a schematic diagram showing a third embodiment of the fresh water recovery system of FIG. 1.

FIG. 4 shows a third embodiment of the fresh water recovery system 400. The second and third embodiments of the fresh water recovery system 200, 400 share a number of common features including a) a salt removal unit 106 for receiving salt water via a supply line 104 from a salt water supply 102 and b) an evaporator 202 fluidly coupled 214, 406, 215 with a condensate storage tank 206. As required by the arrangement of the system components, one or more pumps and/or gravity may be used to move fluids throughout the system.

The salt water supply 102 includes a pump 122 for transferring salt water from a salt water source line 120 to a salt water storage tank 124 via a pump outlet line 123. The supply line 104 is for transporting the salt water from the storage tank to the salt removal unit.

In the salt removal unit 106, a heat exchanger 402 has a salt water (cold) side 404 and a fresh water (hot) side 406. The fresh water side interconnects a first transfer line 214 connected to the evaporator 202 and a second transfer line 215 connected to the condensate storage tank 206. The salt water side interconnects a first supply line 104 connected to the salt water supply 102 and a second supply line 105 connected to a hot salt water storage tank 408. A third supply line 410 interconnects the hot salt water storage tank and the evaporator 202.

FIG. 5 provides a list of the state points 500 marked in FIG. 4 along with a description of each state point and a description of the state, for example liquid or vapor with a relative temperature indication. Before reaching the evaporator 202, a relatively cool salt water liquid enters the heat exchanger salt water side inlet at state point 1 (SP1, shown as circled number in FIG. 4) and a relatively hot salt water liquid near evaporator temperature leaves the heat exchanger salt water side outlet at SP2. Relatively hot salt water liquid near evaporator temperature is stored in the hot salt water tank at SP3 and is in the third supply line at SP4.

At the evaporator 202, relatively hot salt water liquid at evaporator temperature accumulates in an evaporator liquid space at SP5 and relatively hot fresh water vapor at evaporator temperature accumulates in an evaporator vapor space at SP6. A concentrated salt solution and/or dry salt are produced by the evaporation process and SP11 indicates removal of one or more of these products from the evaporator.

At the heat exchanger fresh water side 406, relatively hot fresh water vapor enters the heat exchanger fresh water side inlet at SP7 and cooled fresh water liquid leaves the heat exchanger fresh water side outlet at SP8. As will be understood by persons of ordinary skill in the art, the heat exchanger 402 provides for transferring heat $Q_{EX}$ from the condensing fresh water to the incoming salt water.

At the condensate storage tank 206, cooling fresh water liquid is stored in the tank at SP9 and is available at a tank outlet SP10 as a fresh water supply.

As can be seen, this third embodiment of the fresh water recovery system with heat recovery operates in a fashion similar to that of the second embodiment described above. Differences include the use of a hot salt water storage tank 308 and a particular heat exchanger 402 for transferring $Q_{EX}$.

Among other things, use of a hot salt water storage tank, in some embodiments an insulated tank, enables faster process restarts after stop because use of stored hot water reduces the heat required to restart evaporator operation Qin (corresponds to solar insolence multiplied by time) and thus the time required to restart the evaporator.

Examples of particular heat exchangers include one or more of compact heat exchangers, plate heat exchangers, counter-flow heat exchangers, shell and tube heat exchangers, and other heat exchangers known to persons of ordinary skill in the art to be suited to the present application. In an embodiment, a plate type, counter-flow heat exchanger such as Alfa Laval Inc.'s ALFACOND is used.

Figure 6:
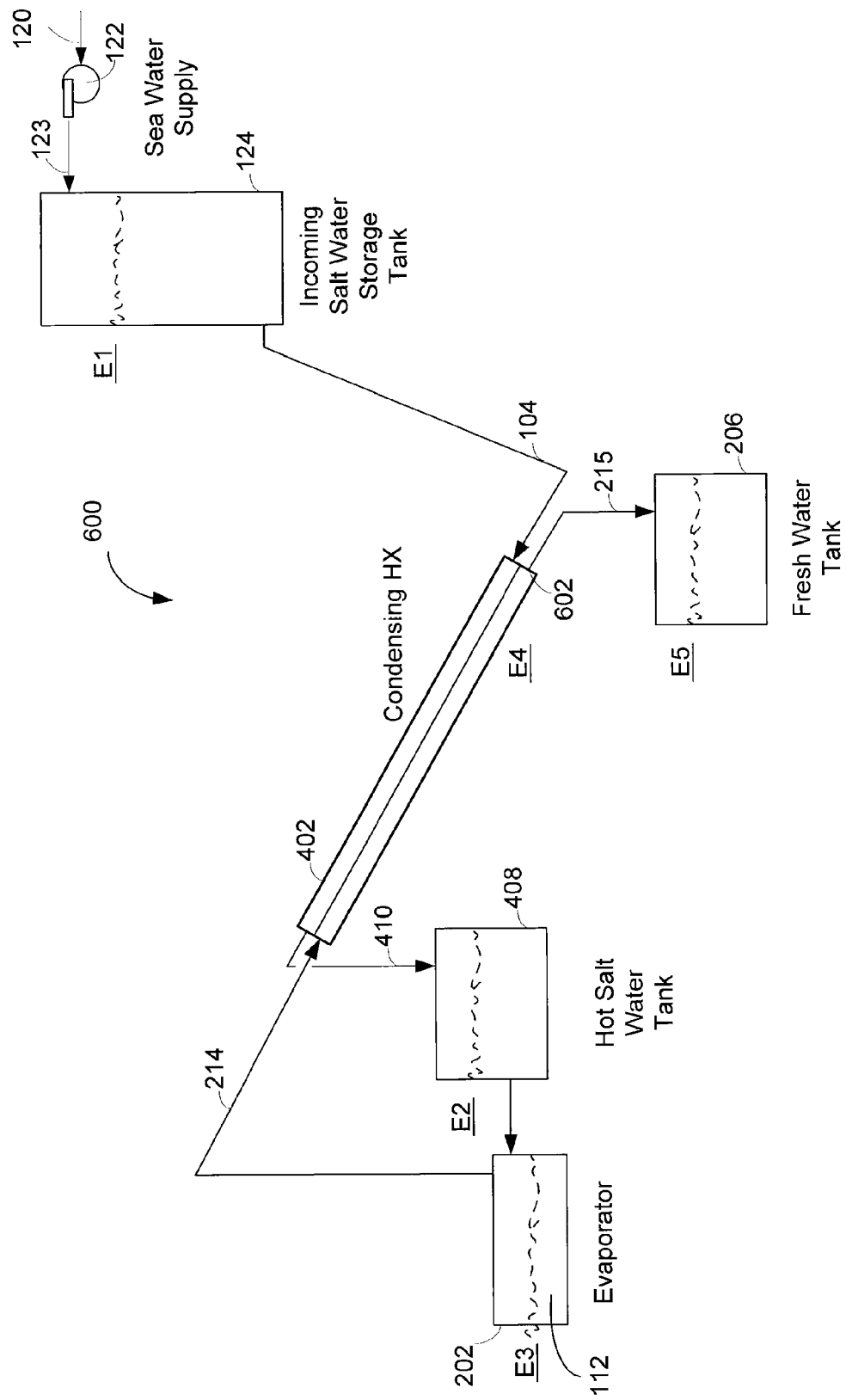
FIG. 6 is a schematic diagram showing a fourth embodiment of the fresh water recovery system of FIG. 1.

FIG. 6 shows a fourth embodiment of the fresh water recovery system 600. In this embodiment, the hardware of the third embodiment is arranged to enhance the use of gravity aided fluid flows.

Liquid levels of the incoming salt water storage tank 124, hot salt water tank 408, evaporator liquid space 112, heat exchanger fresh water side outlet 602, and fresh water tank 206 are at elevations E1, E2, E3, E4, and E5 respectively. In various embodiments, these elevations are set to aid or accomplish gravity flow between two or more of the fluidly connected components.

In an embodiment, gravity flow from the incoming salt water storage tank 124 to the hot salt water tank 408 is aided or accomplished by setting elevations such that E1>E2. In an embodiment, gravity flow from the hot salt water tank to the evaporator liquid space 112 is aided or accomplished by setting elevations such that E2>E3. In an embodiment, gravity flow from the heat exchanger hot side outlet 602 to the fresh water tank is aided or accomplished by setting elevations such that E4>E5. And, in an embodiment, E1>E2>E3 and E4>E5 for aiding or accomplishing gravity flow throughout the fresh water recovery system.

Figure 7:
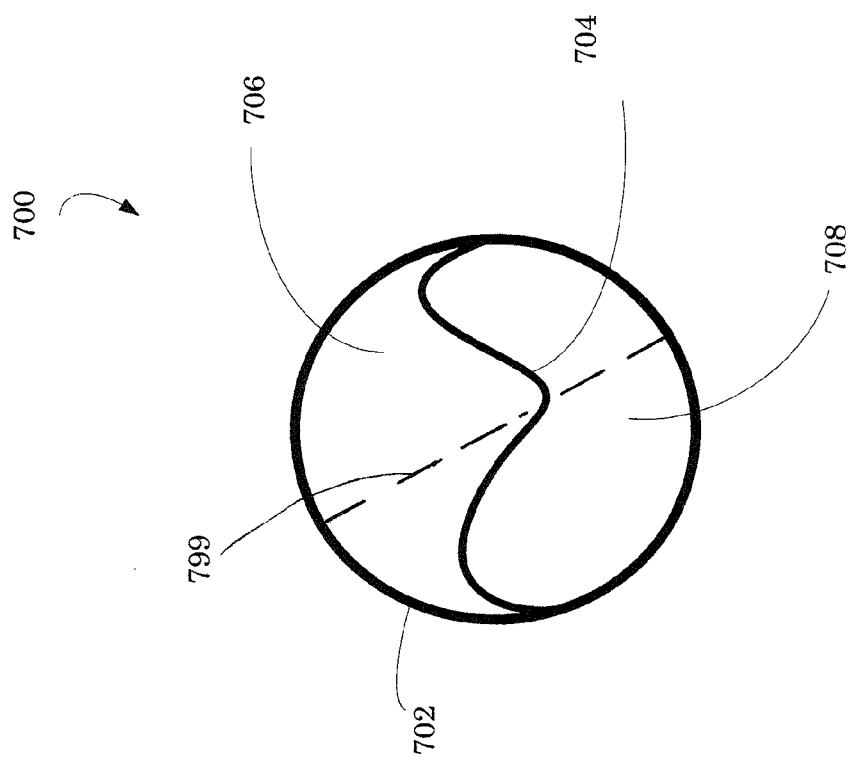
FIG. 7 is a cross-sectional drawing of a divided tube heat exchanger for use with selected embodiments of the fresh water recovery system of FIG. 1.

In some embodiments, use of a divided tube type heat exchanger provides advantages including one or more of enhanced gravity flow characteristics, simplicity of counter-flow operation, and economical construction. FIG. 7 shows a cross-sectional view of a typical divided tube heat exchanger US 2012/0186970 A1 700. The divided tube heat exchanger includes a condensing section 706 for a fresh water stream and a non-condensing section 708 for a salt water stream. In various embodiments, the tubular heat exchanger includes one or more of a tubular envelope 702 for containing the two streams and a dividing wall or septum 704 separating the two streams of the tubular envelope. In some embodiments, the septum is designed to present a greater heat transfer area than that available from a planar septum 704. Reference is made to the alternative planar septum 799.

As discussed above, the present invention recovers fresh water from a salt water supply. Summarizing system operation, salt water entering the fresh water recovery system 102, 120 is processed in the salt water removal unit 106 using a solar heated evaporator 202. Waste heat recovery from fresh water vapor produced in the evaporator 420 occurs during condensation of the vapor and transfer of its latent heat of vaporization $Q_{EX}$ to the salt water entering the system. The condensed vapor provides a fresh water supply 108 and salt concentrated or dried in the evaporator provides a salt supply 110.

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

What is claimed is:

1. A method of recovering fresh water from a salt water supply, the method comprising the steps of:

providing an evaporator configured to receive solar energy;

providing a counterflow heat exchanger having a hot side and a cold side;

transferring salt water to the evaporator via a cold side flow of the counterflow heat exchanger;

transferring fresh water to a fresh water storage tank via a hot side flow of the counterflow heat exchanger;

condensing vapor from the evaporator while heating salt water being supplied to the evaporator;

recovering one or more of a salt in solution and a salt not in solution from the evaporator;

providing a heat exchanger tube;

exchanging heat between isolated hot side and cold side flows contained by the tube;

providing a heat exchanger tube divider across which heat exchange between the hot side and cold side flows takes place; and configuring the heat exchanger tube divider such that it has an area greater than that of a planar tube divider.

* * * * *